United States Patent [19]

Elliott et al.

[11] Patent Number: 4,694,210
[45] Date of Patent: Sep. 15, 1987

[54] BRUSHLESS DC MOTOR AND SENSORLESS DRIVE ARRANGEMENT THEREFOR

[75] Inventors: James O. Elliott, Beavercreek; Jack W. Savage, Centerville, both of Ohio

[73] Assignee: General Motors Corporation, Detroit, Mich.

[21] Appl. No.: 891,108

[22] Filed: Jul. 31, 1986

[51] Int. Cl.⁴ .............................................. H02K 11/00
[52] U.S. Cl. ..................................... 310/68 R; 310/43; 310/46; 310/67 R; 310/156; 318/138; 318/439; 324/161
[58] Field of Search .................. 310/68 R, 45, 68 B, 310/46, 43, 72, 67 R, 41, 180, 261, 156, 162, 184, 254, 177; 318/138, 439; 324/161, 177

[56] References Cited

U.S. PATENT DOCUMENTS

| | | | |
|---|---|---|---|
| 3,277,669 | 10/1966 | Woolley | 310/41 UX |
| 3,757,167 | 9/1973 | Yoshikawa | 324/161 |
| 4,115,715 | 9/1978 | Muller | 310/156 |
| 4,162,435 | 7/1979 | Wright | 318/138 |
| 4,197,489 | 4/1980 | Dunn | 310/67 R |
| 4,206,379 | 6/1980 | Onda | 310/43 |
| 4,250,435 | 2/1981 | Alley | 318/138 |
| 4,262,237 | 4/1981 | Gelenius | 318/138 |
| 4,506,178 | 3/1985 | Bukoschek | 310/41 |
| 4,574,211 | 3/1986 | Muller | 310/67 R |
| 4,585,979 | 4/1986 | Sakamoto | 310/68 R |

Primary Examiner—R. Skudy
Attorney, Agent, or Firm—Mark A. Navarre

[57] ABSTRACT

A resilient coupling between the rotor and output shaft of a brushless DC motor cooperates with a sensorless drive arrangement that obtains rotor position information from the voltage induced in the stator windings of the motor to reduce the effective inertia of the load and aid in starting of the motor.

1 Claim, 3 Drawing Figures

BRUSHLESS DC MOTOR AND SENSORLESS DRIVE ARRANGEMENT THEREFOR

This invention relates to sensorless commutation of a brushless DC motor, and more particularly to a motor construction which aids starting of the motor when the motor is connected to drive a high inertia load.

In general, brushless DC motor control involves sequential energization of the stator or phase windings in relation to the rotor position to develop positive motor torque for driving a load. Information concerning the rotor position is either directly detected with a dedicated sensor such as an optical encoder or Hall Effect devices, or inferred from the voltages induced in the stator windings. Controllers in which the rotor position information is inferred are generally referred to as sensorless controllers.

The drawback with sensorless controllers is that the level of the generated voltages is related to the rotor speed, and the motor must somehow be started before the voltages are sufficiently great to enable the rotor position information to be reliably inferred. It is to this aspect of motor control that the present invention is primarily directed.

Sensorless starting may be effected by randomly energizing a given stator winding and monitoring the voltage thereby generated in the other windings. If the energization of the given winding causes the rotor to turn (albeit momentary) at a relatively high speed, such as 100-200 RPM, the generated voltages will be adequate to reliably infer rotor position, and the windings can be synchronously energized to accelerate the rotor to its running speed. If the energization fails to impart sufficient movement to the rotor, the rotor position information will not be reliably inferred, and the controller may be unable to start the motor.

Starting is especially difficult in situations where the motor/load inertia is relatively high, and the winding current is limited to protect the commutation control elements. In such cases, the starting torque produced by the initial winding energization may fail to produce sufficient rotor movement to reliably infer rotor position. This situation occurs, for example, in automotive applications where the operating voltage is relatively low and the motor drives a high inertia load such as an engine cooling fan.

Technically, the startability characteristic referred to above may be represented by the ratio $T/I_o$, where $T$ is the motor torque, and $I_o$ is the combined polar moment of inertia of the motor and load. If the ratio is relatively high, the initial winding energization will likely impart sufficient motor rotation to reliably infer rotor position. If the ratio is relatively low, the initial motor rotation will be lower, and it may take several attempts before starting is achieved.

This invention provides a novel combination of a sensorless controller and a brushless motor construction which permits an increase in the effective $T/I_o$ ratio of the motor and load. Essentially, the rotor comprises two members coupled by a resilient elastomeric member so that the rotor magnets can move relative to the load. The coupling produces an effective increase in the ratio $T/I_o$ sufficient to allow relatively fast initial movement of the rotor magnets in response to the initial winding energization. The movement produces relatively high generated voltages for inferring rotor position information. Thereafter, the windings can be energized to develop torque in synchronism with the rotor position for accelerating the rotor and load to their normal running speed. In the preferred embodiment, the rotor is disposed about a central stator, and the elastomeric coupling is disposed between a rotor flux ring and an annular rotor output member which supports a load in the form of an engine cooling fan.

IN THE DRAWINGS

Figure 1:
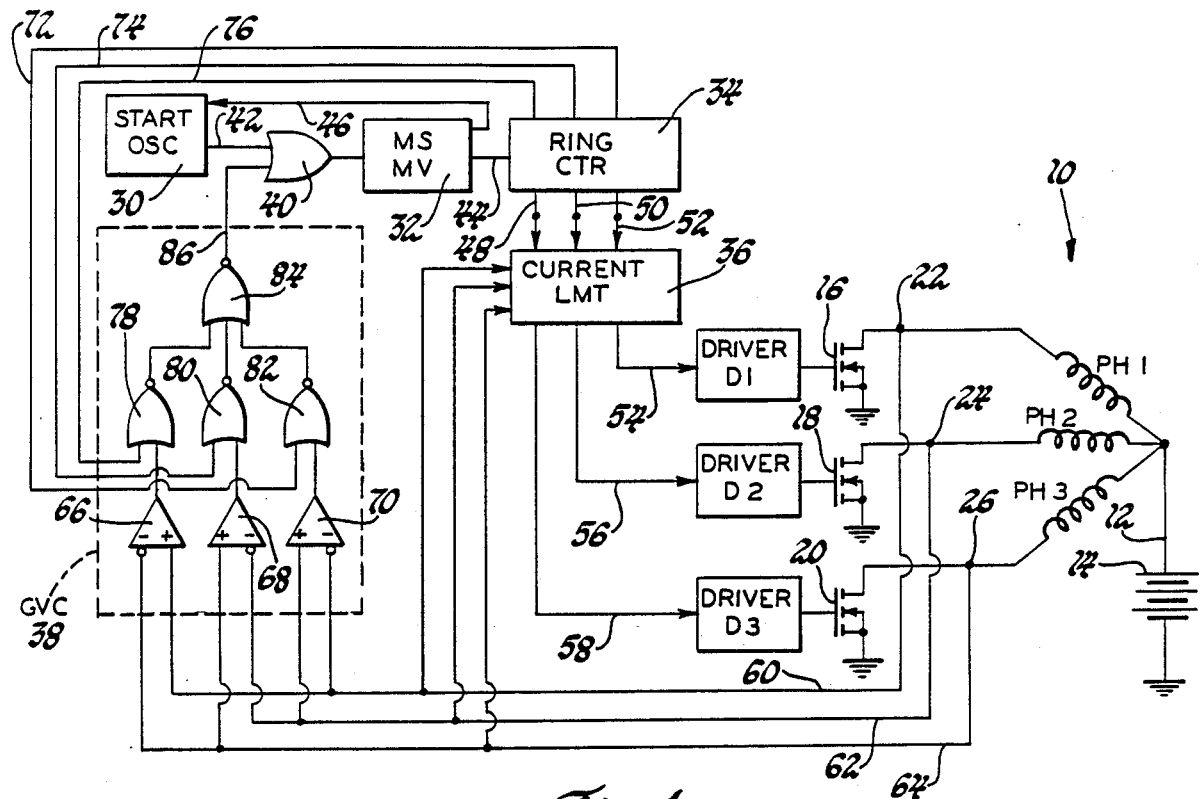
FIG. 1 is a circuit diagram of a sensorless controller for energizing the stator windings of a brushless DC motor.

Referring now to the drawings, and more particularly to FIG. 1, the reference numeral 10 generally designates the stator or phase windings PH1, PH2, and PH3 of a three-phase brushless DC motor. The motor includes a permanent magnet rotor (not shown) which is adapted to rotatably drive a mechanical load, such as an automotive engine cooling fan.

The phase windings PH1-PH3 are connected in a WYE configuration, the center of the WYE being connected via line 12 to the positive terminal of an automotive storage battery 14. The negative terminal of battery 14 is connected to the vehicle ground, and the power transistors 16-20 are controlled by the drivers D1-D3 to selectively connect phase winding terminals 22-26 to ground potential to complete the respective winding energization circuits through battery 14.

The elements 30-38 control the drivers D1-D3 for suitably energizing the windings PH1-PH3. The element 30 is a clock oscillator/divider, designated START OSC; the element 32 is a monostable multivibrator, designated MSMV; the element 34 is a divide-by-three ring counter, designated RING CTR; the element 36 is a current limit circuit, designated CURRENT LMT; and the element 38 is, a generated voltage comparator, designated GVC. The outputs of START OSC 30 and GVC 38 are applied as inputs to the OR gate 40, which is connected to the trigger input of MSMV 32.

The START OSC 30 produces periodic output pulses at a relatively low frequency such as 1 Hz. on line 42 for triggering MSMV 32. After a predetermined delay, MSMV 32 outputs a signal on line 44 for advancing RING CTR 34, and a complementary signal on line 46 for resetting START OSC 30. The output of RING CTR 34 on lines 48-52 controls the operation of drivers D1-D3 through the CURRENT LMT circuit 36 and lines 54-58. The CURRENT LMT circuit 36 is responsive to the forward voltage drop signal across the energized dirver D1-D3 on line 60, 62 or 64, and operates to interrupt the applied voltage whenever the voltage across the energized phase winding indicates that the winding current is in excess of a reference amount.

The phase winding voltage signals on lines 60-64 are also applied to the GVC circuit 38. The GVC circuit 38 includes comparators 66-70 for comparing the signals representing the generated voltages across the deenergized phase windings to infer rotor position and to determine when the phase winding energization sequence should be advanced. The complement outputs of RING CTR 34 on lines 72-76 are used to select the proper comparator output through NOR-gates 78-84. When phase winding PH1 is energized, the output of comparator 68 (which compares the voltages of windings PH2 and PH3) is selected. Similarly, the output of comparator 66 is selected when phase winding PH2 is energized, and the output of comparator 70 is selected when phase winding PH3 is energized. When the generated voltage signal of the phase winding about to be energized exceeds the generated voltage signal of the last energized phase winding, the GVC circuit 38 outputs a control signal to on line 86 for triggering MSMV 32 via OR-gate 40, and initiating advancement of the output of RING CTR 34. The MSMV 32 serves to delay the commutation of the windings PH1–PH3 since the output signal of GVC 38 may not coincide with the optimum firing angle.

In operation, starting is initiated by energizing one of the phase windings PH1–PH3 in accordance with the output of RING CTR 34. Such energization is made without knowledge of the rotor position, and will likely produce less than maximum torque. While the winding is being energized, the appropriate comparator 66–70 of GVC circuit 38 compares the generated voltages in the deenergized windings for the purpose of inferring rotor position information. If the generated voltages are sufficient to infer the rotor position, and the rotor movement is in the correct direction, GVC circuit 38 triggers MSMV 32 through OR-gate 40 to advance RING CTR 34 for energizing the next winding of the energization sequence. If the generated voltages are insufficient to infer rotor position, nothing happens until about 1 second later when START OSC 30 triggers MSMV 32 to advance the phase winding energization sequence.

Figure 2:
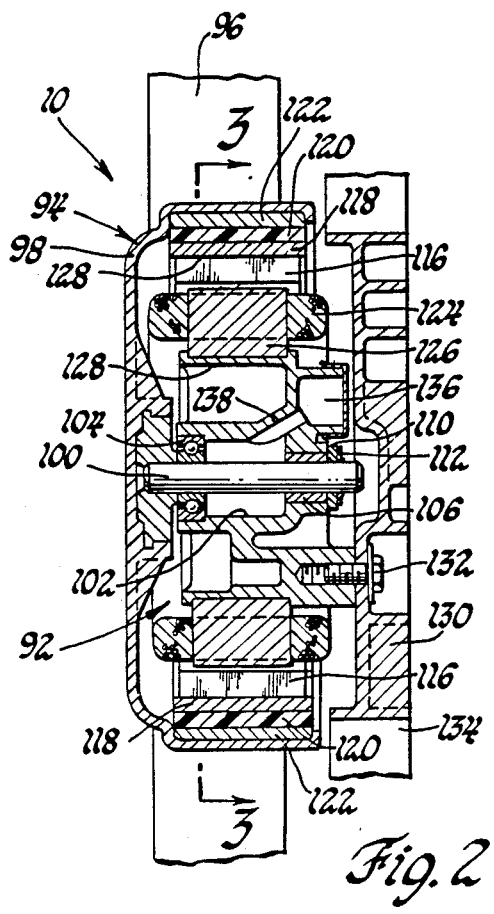
FIGS. 2-3 depict the construction of a brushless DC motor in accordance with the teachings of this invention.
Figure 3:
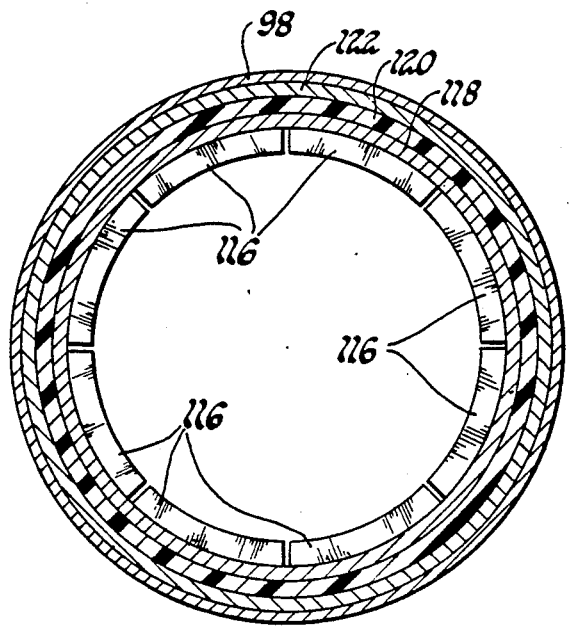

In FIGS. 2–3, the reference numeral 10 generally designates the brushless DC motor of FIG. 1. It comprises a central stator assembly 92 and an annular rotor assembly 94 disposed thereabout. An axial flow fan 96 is drivingly coupled to a rotor output cup 98, which is supported on the rotor shaft 100. The rotor shaft 100 is received within a recess 102 of the stator assembly 92 and rotatably supported therein by the press-fit bearings 104 and 106. Thrust bearing washer 110 is retained by the retainer ring 112. A plurality of radially magnetized permanent magnets 116 are secured to the inner periphery of a rotor flux ring 118. The flux ring 118 is coupled to an annular suspension ring 122 with an elastomeric member 120, and the suspension ring 122 is rigidly coupled to the rotor output cup 98.

The stator assembly 92 comprises a winding set 124 and laminated stator core 126 mounted on a support member 128. The winding set 124 is electronically commutated by the control circuit of FIG. 1 as described above. The support member 128 is mounted on a stator housing 130 by a plurality of screw fasteners 132. The stator housing 130 includes a peripheral member 134 for securing the motor 10 to a stationary support. A lubricant reservoir 136 defined by a recess in the support member 128 supplies lubricating fluid to the rotor shaft 100 and the bearings 104 and 106 via the drilled passage 138 and recess 102.

Preferably, the elastomeric member 120 is insert molded between the flux ring 118 and suspension ring 122, and is bonded to the peripheries thereof. A material such as neoprene is suitable. In the illustrated embodiment, the member 120 has a thickness of about 4 mm, and has a characteristic spring rate, or K-factor, of approximately 0.1 radians displacement per N-m of applied torque.

The resiliency of elastomeric member 120 permits relative movement between the rotor magnets 116 and the phase windings PH1–PH3 without corresponding movement of the fan 96. As a result, the rotor magnets 116 experience a relatively high initial velocity (such as 100–150 RPM) in response to the initial winding energization. The voltages thereby generated in the stator windings PH1–PH3 are correspondingly high, and the controller is able to reliably infer the rotor position therefrom. Once the rotor position is inferred, the winding energization sequence may be synchronously advanced to produce maximum torque for accelerating the rotor and load to their running speed.

While this invention is preferably mechanized with a motor having an "outside rotor" configuration as shown and described herein, it could also be mechanized with the more conventional "inside rotor" configuration. In such configuration, the permanent magnets are secured to the outer periphery of the annular flux ring, and the flux ring is coupled to a central rotor output member by a resilient member such as the elastomeric member 120.

The essence of this invention is the novel combination of the described brushless motor construction and a controller which commutates the motor windings based on the voltages generated therein due to movement of the rotor. It is recognized that the controller described in reference to FIG. 1 is not the only controller meeting this specification. For example, the generated voltages could be compared to a predetermined reference voltage instead of to each other, if desired. In this vein, it is expected that various other modifications to the illustrated embodiment will occur to those skilled in the art; motors and controllers incorporating such modifications may also fall within the scope of this invention, which is defined by the appended claims.

The embodiments of the invention in which an exclusive property or privilege is claimed are defined as follows:

1. A brushless motor and drive arrangement comprising in combination:
   a rotary output member rigidly coupled to a driven load, a magnetic rotor assembly including a plurality of permanent magnets mounted on the periphery of an annular magnetic ring, a stator assembly including at least two stator windings disposed relative to said magnetic rotor assembly such that (1) energization of an individual winding thereof with electric current develops torque for imparting rotary motion to the magnetic rotor assembly, and (2) movement of the rotor assembly relative to the stator assembly induces a voltage in the stator windings, a sensorless controller including means for initiating movement of the rotor assembly by energizing a given one of the stator windings and monitoring the voltage, whereby induced in at least one other stator winding to obtain rotor position information therefrom for synchronizing subsequenty energization of the stator windings with the rotor position, and resilient means for coupling the annular magnetic ring to the rotary output member so that when the controller energizes a given stator winding to initiate movement of the magnetic rotor assembly, the magnetic rotor assembly is able to rotate relative to the rotary output member and load at an effective velocity which induces a greater voltage in the other stator windings than would otherwise occur, thereby enabling the controller to obtain reliable rotor information for successfully starting the motor and load even though the load has relatively high inertia.

* * * * *